Sept. 8, 1931.  R. D. VAN NORDSTRAND  1,822,760
SHIP PROPULSION SYSTEM
Filed Nov. 13, 1928
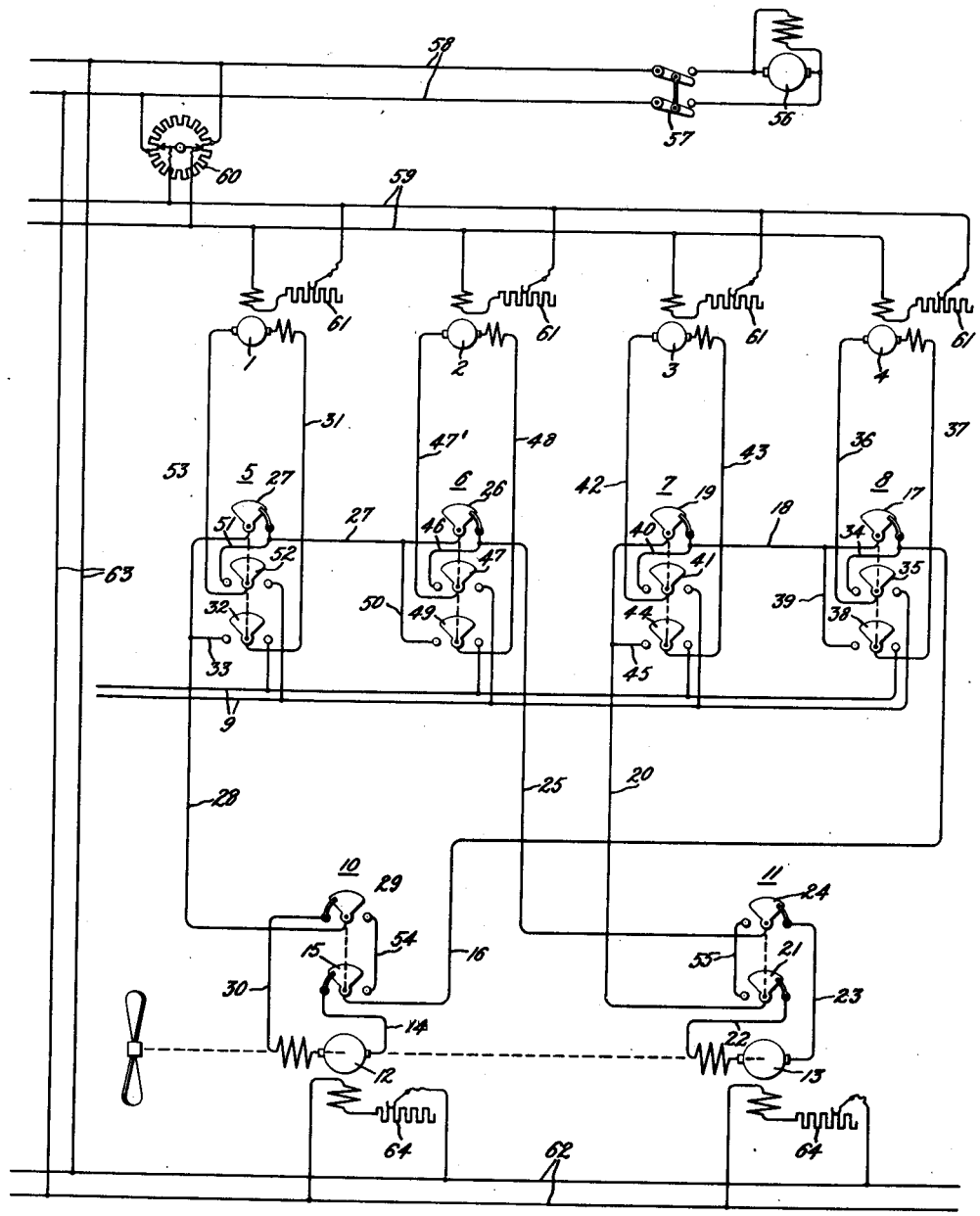
Inventor:
Robert D. Van Nordstrand,
by Charles E. Tullar
His Attorney Patented Sept. 8, 1931

1,822,760

UNITED STATES PATENT OFFICE

ROBERT D. VAN NORDSTRAND, OF SCOTIA, NEW YORK, ASSIGNOR TO GENERAL ELECTRIC COMPANY, A CORPORATION OF NEW YORK

SHIP PROPULSION SYSTEM

Application filed November 13, 1928. Serial No. 319,093.

My invention relates to power systems and methods of operating the same whereby the motor speed may be varied without producing motor instability or loss of motor torque. More particularly, my invention relates to a particular arrangement of apparatus and a method of operating the same in systems in which the power and torque demand of the load increases and decreases much more rapidly than does its speed, as for example in ship propulsion systems.

The power demand of the screw or wheel of a ship varies approximately as the cube of its speed, and the torque as the square of its speed. Assuming the variation in power as being proportional to the cube of the speed and, therefore, the torque proportional to the square of the speed (the actual propeller curve is usually very close to this) it will be seen that the following conditions exist:

| Power | Speed | Torque |
|---|---|---|
| 100 per cent | 100 per cent | 100 per cent. |
| 75 per cent | 91 per cent | 83 per cent. |
| 50 per cent | 79.5 per cent | 63 per cent. |
| 25 per cent | 63 per cent | 39.7 per cent. |

It is common practice to employ in a ship propulsion system a plurality of independently driven generators which are connected in series with the propulsion motor or motors. The following are some of the reasons for this practice: (1) Higher speed available in the smaller units, (2) greater reliability due to the possibility of shutting down part of the plant without interfering with the rest of the plant, (3) greater flexibility in adapting the needs to periodical demands such as occur in ferry boat service, etc. In order that the generators may be interchangeable, their normal rating as to current and voltage are usually made the same but not necessarily so.

In such a system including four generating units, if only three of the units are available, the power available is then only 75% and the voltage available is likewise only 75%. Therefore, if the propulsion motor characteristics are left unchanged, only 75% speed will be obtained. It will be noted, however, from the above table showing the relationship between power, speed, and torque, that 91% propeller speed is necessary to absorb 75% power and, therefore, that a means must be found for changing the speed of the motor if the total available power is to be consumed by the motor. This is usually done by weakening the motor field and under some of the conditions of operation this field weakening may become so great for a particular design of motor as to cause instability and even loss of torque.

It is an object of my invention to load fully those generators retained in circuit when operating with less than the full number of generators and to overcome instability and loss of motor torque by employing a plurality of series connected motors for driving the propeller and varying the speed of the propeller by controlling the field of only one of the motors. By weakening the field of one of the motors used to drive the propeller it is possible to secure the desired speed variation of the propeller without producing instability due to the fact that full field on the other motors causes them to operate at full torque and under stable conditions.

My invention will be better understood from the following description taken in connection with the accompanying drawing and its scope will be pointed out in the appended claims.

The single figure of the accompanying drawing illustrates diagrammatically a ship propulsion system including four generators and two motors. The generators 1, 2, 3 and 4 may be connected through switches 5, 6, 7 and 8 to auxiliary apparatus connected to the power mains 9 or through additional switches 10 and 11 to propeller motors 12 and 13. In the particular arrangement illustrated motors 12 and 13 are interspersed between the generators 1, 2 and 3, 4 in order to reduce the voltage in the system. The invention, however, is not limited to such an arrangement of apparatus for the motors and generators may be connected in any desired manner.

Each of the switches 5, 6, 7 and 8 is provided with three blades. The upper blade of each of these switches when in the position illustrated in the drawing completes the motor circuit independently of its respective generator. Thus, when the switches are in their illustrated positions a circuit is completed through motors 12 and 13 as follows: From motor 12, through conductor 14, lower switch blade 15 of switch 10, conductor 16, upper switch blade 17 of switch 8, conductor 18, upper switch blade 19 of switch 7, conductor 20, lower switch blade 21 of switch 11, conductor 22, motor 13, conductor 23, upper switch blade 24 of switch 11, conductor 25, upper switch blade 26 of switch 6, conductor 27, upper switch blade 27 of switch 5, conductor 28, upper switch blade 29 of switch 10, and conductor 30 back to motor 12. If all of the switches 5, 6, 7 and 8 are thrown to the left they complete a circuit through the individual generators, 1, 2, 3, and 4 and the motors 12 and 13 as follows: From generator 1, through conductor 31, lower switch blade 32 of switch 5, conductor 33, conductor 28, upper switch blade 29 of switch 10, conductor 30, motor 12, conductor 14, lower switch blade 15 of switch 10, conductor 16, conductor 34, middle switch blade 35 of switch 8, conductor 36, generator 4, conductor 37, lower switch blade 38 of switch 8, conductors 39, 18 and 40, middle switch blade 41 of switch 7, conductor 42, generator 3, conductor 43, lower switch blade 44 of switch 7, conductors 45 and 20, lower switch blade 21 of switch 11, conductor 22, motor 13, conductor 23, upper switch blade 24 of switch 11, conductors 25 and 46, middle switch blade 47 of switch 6, conductor 47', generator 2, conductor 48, lower switch blade 49 of switch 6, conductors 50, 27 and 51, middle switch blade 52 of switch 5 and conductor 53, back to generator 1. At the same time the circuit previously traced is interrupted by the upper blades 27, 26, 19 and 17 of the switches 5, 6, 7 and 8. If any one of the switches 5, 6, 7, 8 is thrown to the right hand position its respective generator is directly connected through the lower blades of the switches to the auxiliary power bus 9 and at the same time the power circuit is completed by means of the upper blade of the switch so that the remaining generators may supply power to the motors 12 and 13 connected in the circuit. Motor 12 may be removed from the circuit by operating the switch 10 to the right which then completes the power circuit through conductor 54 and disconnects the motor 12 from the circuit. By operating switch 11 to the left the motor 13 may be removed from the power circuit which is then completed through conductor 55.

Excitation is furnished in the illustrated system to the generators and motors by an exciter 56 which is connected through a switch 57 to a main excitation bus 58. The generator excitation bus 59 is connected to the main excitation bus 58 through a reversing rheostat 60. The individual fields of the motors 1, 2, 3 and 4 are connected in parallel to the generator excitation bus 59 and the strength of the individual generator fields may be adjusted by means of rheostats 61. By operating the reversing rheostat 60 the fields of the various generators may be simultaneously controlled. The motor excitation bus 62 is connected by means of conductors 63 to the main excitation bus 58. The fields of the individual motors may be controlled by means of rheostats 64 inserted in the field circuit of each motor.

Assuming that the ship has been operating with all four generators supplying power to motors 12 and 13 and that for some reason it is found desirable to now operate with only three generators in circuit, for example generators 1, 2 and 3, generator 4 will be removed from the power circuit by placing switch 8 in its illustrated position and switches 5, 6 and 7 of generators 1, 2 and 3 will be left in the left-hand positions in which they were previously placed in order to connect generators 1, 2 and 3 in series with motors 12 and 13. Generators 1, 2 and 3 will be able to furnish 75% power but will only furnish 75% voltage provided they are still operating at full field and at normal speed. 75% voltage, however, when applied to motors 12 and 13 when left in their previous condition of adjustment will cause these motors to operate at 75% speed. By referring to the table showing the relation between the power demand and speed of the propeller it will be noted that for the 75% power condition 91% speed is necessary. According to my invention in order to secure this increase in speed the field of one of the motors, for example motor 13, will be weakened while the field of the other motor will be left at its normal value in order to secure increased speed of propeller operation. Since the motors 12 and 13 are positively connected to one another and to the propeller it is impossible for them to run at different speeds and they will assume a speed in accordance with their combined excitations. However, since motor 12 is operated at full field it will operate with full torque and the system will operate in a stable manner.

It is thus apparent that by controlling the field of but one of a plurality of series connected motors used to drive a load device whose speed must be varied in order to vary its power consumption, the speed of said device may be varied without producing instability in the system. Although I have shown and described a particular embodiment of my invention it is to be understood that such modifications and variations are contemplated as fall within the scope of my invention which is set forth in the appended claims.

What I claim as new and desire to secure by Letters Patent of the United States, is:

1. The method of operating a power system wherein any predetermined number of generators may be connected in series with a plurality of series connected motors mechanically connected to one another and to a load device whose power demand increases and decreases at a greater rate than its speed, which includes the acts of decreasing the number of generators connected in circuit with said motors, and decreasing the excitation of only one of said motors sufficiently to increase the speed of said motors above that speed at which they would normally operate when connected to said lesser number of generators if left in their previous condition of adjustment to increase the motor load to a value sufficient to fully load said lesser number of generators.

2. The method of operating a power system wherein any predetermined number of generators may be connected in series with a plurality of series connected motors mechanically connected to one another and to a load device whose power demand increases and decreases at a greater rate than its speed, which includes the acts of changing the number of generators employed to furnish motive power to said motors, operating said generators at normal speed and normal voltage, operating with full field on all but one of said motors, and adjusting the field strength of said motor sufficiently to set the motor speed at that value which is found necessary to increase the motor load sufficiently to load fully the generators connected in circuit with said motors.

3. The method of operating a ship propulsion system wherein a propeller is driven by a plurality of series connected motors supplied with power from a plurality of independently driven generators, the number of which connected in series with said motors may be varied which includes the steps of reducing the number of generators in circuit with the motors and reducing the field on but one of said motors to such a value that the motor speed will attain a value sufficient to drive the propeller at that speed which will load fully the number of generators included in the working circuit.

4. The method of operating a ship propulsion system wherein a propeller is driven by a plurality of series connected motors supplied with power from a plurality of independently driven generators, the number of which connected in series with said motors may be varied which includes the acts of changing the number of generators employed to furnish motive power to the said propelling motors, operating said generators at normal speed and normal voltage, operating with full field on all but one of said motors, and changing the field strength of said motor sufficiently to set the speed of the propeller at that value found necessary to load fully the generators connected in circuit with said motors.

In witness whereof, I have hereunto set my hand this 12th day of November, 1928.
ROBERT D. VAN NORDSTRAND.